(12) United States Patent
Zoller et al.

(10) Patent No.: US 11,366,452 B2
(45) Date of Patent: Jun. 21, 2022

(54) METHOD FOR TRANSMITTING A SET OF TOOL DATA OF A CUTTING TOOL TO A CNC MACHINE TOOL

(71) Applicant: E. Zoller GmbH & Co. KG Einstell—und Messgeraete, Pleidelsheim (DE)

(72) Inventors: Alexander Zoller, Pleidelsheim (DE); Christian Pfau, Ingersheim (DE)

(73) Assignee: E. ZOLLER GMBH & CO. KG EINSTELL-UND MESSGERÄTE, Pleidelsheim (DE)

( * ) Notice: Subject to any disclaimer, the term of this patent is extended or adjusted under 35 U.S.C. 154(b) by 0 days.

(21) Appl. No.: 17/054,564

(22) PCT Filed: Dec. 20, 2018

(86) PCT No.: PCT/EP2018/086358
§ 371 (c)(1),
(2) Date: Nov. 11, 2020

(87) PCT Pub. No.: WO2019/219229
PCT Pub. Date: Nov. 21, 2019

(65) Prior Publication Data
US 2021/0240162 A1 Aug. 5, 2021

(30) Foreign Application Priority Data
May 15, 2018 (DE) .................. 10 2018 111 547.4

(51) Int. Cl.
*G05B 19/4093* (2006.01)
*G05B 19/401* (2006.01)
*G05B 19/4097* (2006.01)

(52) U.S. Cl.
CPC ..... *G05B 19/40938* (2013.01); *G05B 19/401* (2013.01); *G05B 19/4097* (2013.01); *G05B 2219/49302* (2013.01)

(58) Field of Classification Search
CPC ............ G05B 19/40938; G05B 19/401; G05B 19/4097; G05B 2219/49302; G05B 19/408; Y02P 90/02
See application file for complete search history.

(56) References Cited

U.S. PATENT DOCUMENTS

| 6,047,579 | A | * | 4/2000 | Schmitz | ................. B30B 15/26 483/28 |
| 2007/0203611 | A1 | * | 8/2007 | Lindstrom | ......... G05B 19/4065 700/175 |

(Continued)

FOREIGN PATENT DOCUMENTS

| DE | 20010529 U1 | 11/2000 | |
| DE | 102006024904 A1 * | 11/2007 | ............... B25H 3/00 |

(Continued)

OTHER PUBLICATIONS

German Search Report dated Apr. 11, 2019 issued on corresponding DE application No. 10 2018 111 547.4 (and English translation).

(Continued)

*Primary Examiner* — Christopher E. Everett
(74) *Attorney, Agent, or Firm* — Posz Law Group, PLC

(57) ABSTRACT

A method for transmitting at least one tool presetting data set of a machining tool that is stored on an, in particular electronic, storage medium, at least one tool measuring data set of the machining tool that is stored on an, in particular electronic, storage medium and/or at least one tool processing data set of the machining tool that is stored on an, in particular electronic, storage medium to a machine tool that is controlled via Computerized Numerical Control [CNC machine tool], with a data communication unit, wherein in (Continued)

Figure 1:
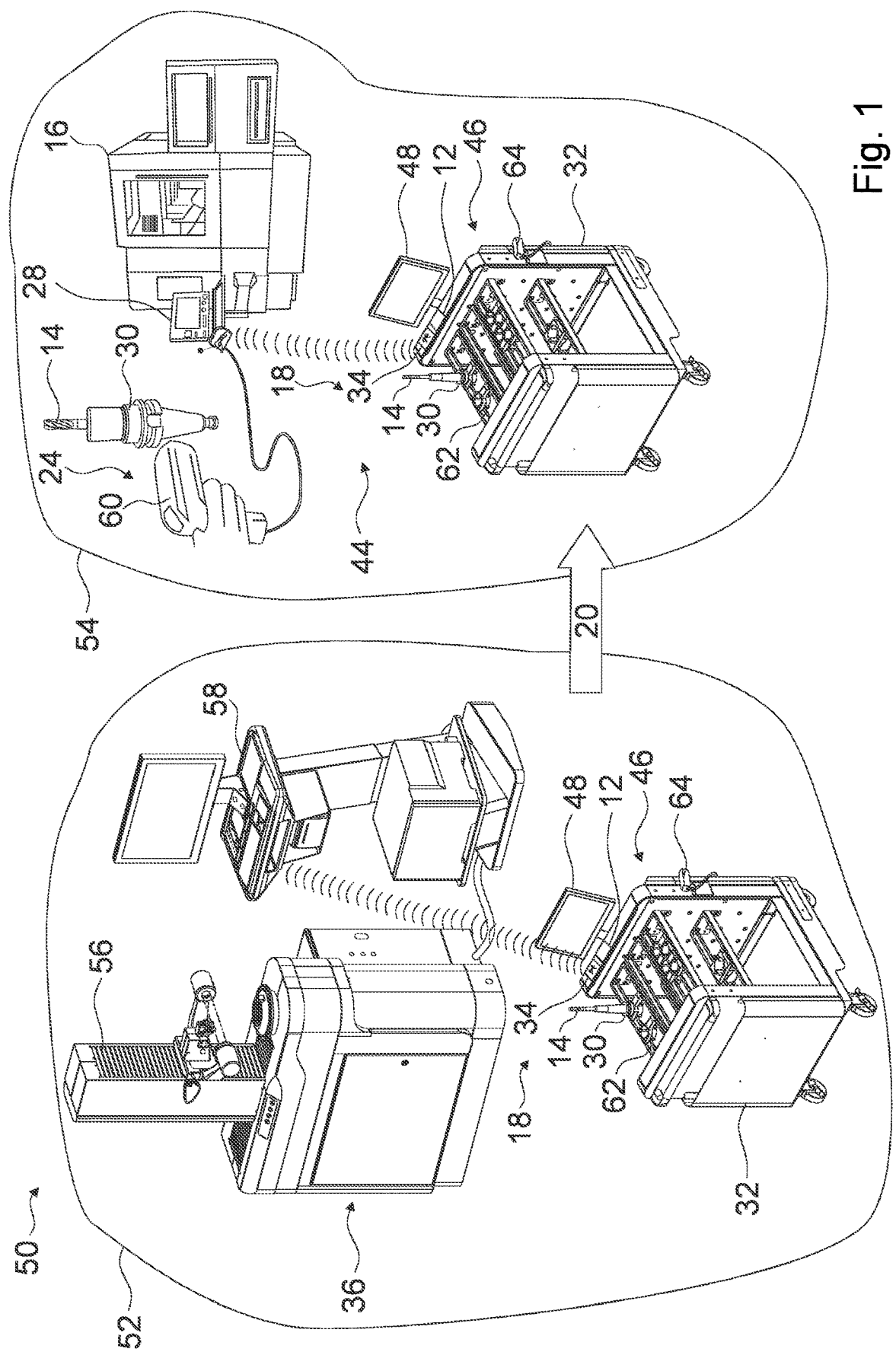

a tool delivery step at least the machining tool is delivered to the CNC machine tool and wherein in a tool identification step the delivered machining tool is identified via a tool identification unit, which is in particular allocated to the CNC machine tool, the method including a read-out step, which is in particular situated temporally after the tool identification step, in which at least the tool presetting data set of the machining tool, the tool measuring data set of the machining tool and/or the tool processing data set of the machining tool are/is read out of the storage medium by the data communication unit and is transmitted to a data processing unit that is allocated to the CNC machine tool, in particular to the CNC machine tool, wherein the storage medium is arranged apart from the machining tool, apart from a tool holder holding the machining tool and apart from the CNC machine tool.

12 Claims, 3 Drawing Sheets

(56) References Cited

U.S. PATENT DOCUMENTS

| | | | | |
|---|---|---|---|---|
| 2014/0350716 | A1* | 11/2014 | Fly | B65G 1/02 700/215 |
| 2015/0105898 | A1* | 4/2015 | Adams | B23K 37/0408 700/160 |
| 2016/0018829 | A1* | 1/2016 | Ellec | H04W 4/80 700/282 |

FOREIGN PATENT DOCUMENTS

| | | |
|---|---|---|
| DE | 102006024904 A1 | 11/2007 |
| DE | 102011001076 B4 | 11/2014 |
| EP | 2664973 A2 | 11/2013 |

OTHER PUBLICATIONS

Roschinger et al., Final report to the Tool Cloud joint project "Cross-company life cycle management for Tools in the cloud by means of clear identification and ID" Apr. 2017, pp. 1-92 ( and English translation).
Third Party Objection of Apr. 8, 2020 issued on corresponding DE application No. 10 2018 111 547.4 (and English translation).
Reply of the opponent of Oct. 30, 2020 on corresponding to DE application No. 10 2018 111 547.4 (and English translation).
Written Opinion of the International Search Report of the International Searching Authority dated Apr. 18, 2019 for the corresponding international application No. PCT/EP2018/086358.
International Preliminary Report on Patentability of the International Searching Authority dated Nov. 17, 2020 for the corresponding international application No. PCT/EP2018/086358.

* cited by examiner

METHOD FOR TRANSMITTING A SET OF TOOL DATA OF A CUTTING TOOL TO A CNC MACHINE TOOL

CROSS REFERENCE TO RELATED APPLICATIONS

This application is a U.S. national stage application of PCT/EP2018/086358 filed on Dec. 20, 2018 which is based on German Patent Application No. 10 2018 111 547.4 filed on May 15, 2018, the contents of which are incorporated herein by reference.

STATE OF THE ART

The invention concerns a method for transmitting at least one tool presetting data set of a machining tool stored on a storage medium, a tool measuring data set of the machining tool and/or a tool processing data set of the machining tool to a machine tool that is controlled via Computerized Numerical Control (CNC machine tool), with a data communication unit according to the preamble of claim 1 and a communication device according to the preamble of claim 12.

It has already been proposed that in a tool delivery step at least the machining tool is delivered to the CNC machine tool and that in a tool identification step the delivered machining tool is identified by means of a tool identification unit.

The objective of the invention is in particular to provide a generic method with a high degree of automatization. The objective is achieved according to the invention by the features of patent claims 1 and 12 while advantageous implementations and further developments of the invention may be gathered from the subclaims.

Advantages of the Invention

The invention is based on a method for transmitting at least one tool presetting data set of a machining tool that is stored on an, in particular electronic, storage medium, a tool measuring data set of the machining tool and/or a tool processing data set of the machining tool to a machine tool that is controlled via Computerized Numerical Control (CNC machine tool), with a data communication unit, wherein in a tool delivery step at least the machining tool is delivered to the CNC machine tool and wherein in a tool identification step the delivered machining tool is identified via a tool identification unit, which is in particular allocated to the CNC machine tool.

It is proposed that a read-out step, which is in particular situated temporally after the tool identification step, in which at least the tool presetting data set of the machining tool, the tool measuring data set of the machining tool and/or the tool processing data set of the machining tool are/is read out of the storage medium by the data communication unit and is transmitted to a data processing unit that is allocated to the CNC machine tool, in particular to the CNC machine tool, wherein the storage medium is arranged apart from the machining tool, apart from a tool holder holding the machining tool and apart from the CNC machine tool. Preferably, in at least one method step a tool data set is stored on the storage medium for a transmission to the CNC machine tool, in particular to the data processing unit allocated to the CNC machine tool, in an, in particular later, method step. Preferentially the storage medium is implemented as an electronic storage medium, for example as a data chip, a hard drive, a flash memory, a solid-state drive, or the like. Preferably the storage medium is implemented as a non-volatile storage. Preferably the tool data set is the tool presetting data set, the tool measuring data set and/or the tool processing data set. Preferentially an unambiguous data identification characteristic, in particular a data identification character string and/or a running data numbering, is allocated to the tool data set. The tool measuring data set preferably comprises at least one piece of information concerning a shape of the machining tool, in particular a radius, a diameter, an angle included by a cutter and a longitudinal axis of the machining tool, or the like. Preferably the tool holder is configured to be inserted in the CNC machine tool together with the machining tool. Preferentially the tool presetting data set comprises at least one piece of information concerning a configuration of the, in particular multi-component, machining tool and/or a relative position of the machining tool to the tool holder holding the machining tool, e.g. a rotation center and/or a height level of a point. Preferentially the tool processing data set comprises at least one piece of information concerning a service life, in particular a remaining service life, a weight, a hardness and/or a material of the machining tool.

Preferably, in the tool delivery step the machining tool is transported, in particular from a preparation area, a maintenance area and/or a storage area, to the CNC machine tool. Preferentially the machining tool is transported to the CNC machine tool in a state of being mounted in the tool holder. Preferably the storage medium is implemented in a mobile fashion. Preferentially, in the tool delivery step the storage medium is transported to the CNC machine tool, in particular to the data processing unit allocated to the CNC machine tool. It is however also conceivable that the storage medium is implemented in a stationary fashion, for example as a central server.

Preferably, in the tool identification step an unambiguous tool identification characteristic, in particular a tool identification character string and/or a running tool numbering, is captured for the machining tool via the tool identification unit. Preferentially the captured tool identification characteristic is transmitted to the data processing unit and/or to the storage medium. Preferably the tool identification unit comprises at least one scan element for capturing the tool identification characteristic. The scan element is in particular configured to read in an optical implementation of the tool identification characteristic, e.g. a barcode, a data matrix label or the like, of the machining tool and/or of the tool holder holding the machining tool. Preferably an identification of the machining tool is effected indirectly via an identification of the tool holder holding the machining tool. Preferentially the tool identification characteristic is fixated on the machining tool and/or on the tool holder by substance-to-substance bond, for example glued on, carved in, burned in, printed on, pressed in, or the like. Preferably the scan element is embodied as a manual scanner. It is however also conceivable for the scan element to be embodied as a stationary scanner, in particular to be integrated in the CNC machine tool. Preferentially the tool identification unit is allocated to the CNC machine tool, in particular connectable to the CNC machine tool and/or fixedly connected with the CNC machine tool. Alternatively the data communication unit comprises at least one data communication interface for a communication of the tool identification unit with the data processing unit that is allocated to the CNC machine tool.

Preferably, in the read-out step the tool identification characteristic captured by the tool identification unit is matched with the data identification characteristic in the storage medium. Preferentially, in the read-out step at least one tool data set belonging to the tool identification characteristic is read out of the storage medium by means of the data communication unit. Preferably, in the read-out step the read-out tool data set is transmitted to the data processing unit via the data communication unit. Preferentially the data processing unit comprises at least a processor, a memory, input and output means, further electronic structural components, an operation program, regulation routines, control routines and/or calculating routines. In particular, the data processing unit is configured to evaluate the transmitted data set for the purpose of a controlling and/or regulation of the CNC machine tool adapted to the identified machining tool. Preferentially the data processing unit is integrated in the CNC machine tool. It is however also conceivable that the data processing unit is realized separately from the CNC machine tool. Preferably a transmission of the tool data set from the storage medium to the data processing unit is carried out in a wireless fashion. It is also conceivable that the tool data set is transmitted from the storage medium to the data processing unit in a wire-bound fashion, in particular via a USB interface of the data communication unit, via an Ethernet interface of the data communication unit and/or via a serial interface of the data communication unit, in particular via RS-232. It is in particular conceivable that, in particular during the tool delivery step, the storage medium is arranged, in particular latched, to the data processing unit and/or the CNC machine tool in a receiving element, in particular on a docking element, of the data communication unit.

"Configured" is in particular to mean specifically programmed, designed and/or equipped. By an object being configured for a certain function is in particular to be understood that the object fulfills and/or executes said certain function in at least one application state and/or operation state.

By the implementation of the method according to the invention an advantageously reliable supply of the CNC machine tool with tool data sets of the machining tool used is achievable. It is in particular possible to dispense with generating paper-bound and/or printed tool data sets. In particular, a risk of mixing up tool data sets and/or of input errors in transmission can be kept at an advantageously low level.

Furthermore it is proposed that the read-out step is automatically initiated by the tool identification step. Preferentially the read-out step is automatically initiated via the tool identification unit by a transmission of the captured tool identification characteristic. Preferably the read-out step is automatically stopped, in particular with an error message, if a matching of the tool identification characteristic with the data identification characteristic has a negative result. It is in particular conceivable that, prior to the transmission of the captured tool identification characteristic, the captured tool identification characteristic is matched, at least in regard to a partial congruency, with a data format for the tool identification characteristic and/or with a list of known tool identification characteristics by means of the tool identification unit. It is in particular conceivable that in case of a partial congruency a user input is requested, for example to repeat the tool identification step and/or for a manual selection out of data identification characteristics that are partially congruent with the tool identification characteristic. Preferentially, in case of a positive, in particular unambiguous, match of the tool identification characteristic with the data identification characteristic, at least one allocated tool data set is automatically transmitted from the storage medium to the data processing unit. The implementation according to the invention allows keeping a number of method steps advantageously low which must be carried out manually when loading the CNC machine tool with the machining tool. In particular, a through-put time for the loading of the CNC machine tool with the machining tool can be kept advantageously short.

It is also proposed that, at least during the tool delivery step, the storage medium is arranged on a tool transport device, in particular a tool cart, for a delivery of the machining tool to the CNC machine tool. Preferably, during the tool delivery step the machining tool is transported to the CNC machine tool by a tool transport device. The tool transport device is preferentially embodied as a tool cart. It is also conceivable for the tool transport device to be embodied as a tool case, as a tool tray, as a tool drum, as a transport receptacle of a conveying-belt device, as a transport drone, or the like. Preferably the storage medium is fixedly integrated in the tool transport device. Alternatively the tool transport device comprises a receiving element for receiving and/or depositing the storage medium at least during the tool delivery step. The implementation according to the invention allows advantageously transporting the storage medium together with the machining tool, in particular from a preparation area, maintenance area and/or storage area, to the CNC machine tool. In particular, it is possible to avoid long communication distances between the storage medium and the CNC machine tool and/or the data processing unit. In particular, it is advantageously possible to avoid installation costs for long data lines between the storage medium and the CNC machine tool and/or the data processing unit. In particular, a signal strength of wireless data communication interfaces of the data communication unit between the storage medium and the CNC machine tool and/or the data processing unit can be kept at an advantageously low level. It is in particular possible to achieve an advantageously high electromagnetic compatibility.

Moreover it is proposed that in the read-out step the tool presetting data set of the machining tool, the tool measuring data set of the machining tool and/or the tool processing data set of the machining tool are/is transferred via a wireless data communication interface of the data communication unit. In particular, the tool presetting data set, the tool measuring data set and/or the tool processing data set are/is transmitted between the storage medium, which is in particular arranged on the tool transport device, and the data processing unit via the wireless data communication interface. The implementation according to the invention enables a realization of the storage medium such that it is advantageously freely movable relative to the data processing unit. In particular, the storage medium can be transported advantageously easily between different areas, in particular a work area, a preparation area and/or a maintenance and/or storage area. In particular, the tool data sets stored on the storage medium, in particular the tool presetting data set, the tool measuring data set and/or the tool processing data set, can be exchanged advantageously easily between the different areas.

It is further proposed that in the read-out step, for a transfer of the tool presetting data set of the machining tool, the tool measuring data set of the machining tool and/or the tool processing data set of the machining tool, a Bluetooth interface of the wireless data communication interface and/or a WLAN interface of the wireless data communication interface are/is activated. In particular, the Bluetooth interface and/or the WLAN interface create/s a data connection between the storage medium and the data processing unit.

Preferably the Bluetooth interface and/or the WLAN interface are/is arranged on the tool transport device and/or on the data processing unit. The implementation according to the invention allows transmitting a tool data set over an advantageously large distance between the storage medium and the data processing unit. It is in particular possible to do without a precise positioning of the storage medium in a read-out area of the data processing unit. It is in particular possible for the storage medium, in particular the tool transport device together with the storage medium, to be arranged in a work area and/or a preparation area in an advantageously flexible manner, in particular for advantageously comfortable handling and/or in an advantageously short time.

Beyond this it is proposed that at least in the read-out step, for the transfer of the tool presetting data set of the machining tool, the tool measuring data set of the machining tool and/or the tool processing data set of the machining tool, the storage medium and/or the data communication unit emulate/s a USB mass storage device. By "USB" is in particular the Universal Serial Bus system to be understood. In particular, the storage medium stores the tool presetting data set of the machining tool, the tool measuring data set of the machining tool and/or the tool processing data set of the machining tool in the emulated USB mass storage device. Preferably, in the read-out step the data communication unit transmits the tool presetting data set of the machining tool, the tool measuring data set of the machining tool and/or the tool processing data set of the machining tool in the emulated USB mass storage device of the storage medium to a USB interface of the data processing unit, in particular a USB interface of the CNC machine tool. Preferentially the storage medium partitions the tool presetting data set of the machining tool, the tool measuring data set of the machining tool and/or the tool processing data set of the machining tool in the emulated USB mass storage device into data packages. In particular, a data package has a size that is adapted to a data processing capacity of the data processing unit, in particular of the CNC machine tool. Preferably one data package per read-out step is stored on the emulated USB mass storage device. In particular, data packages are successively stored from the storage medium into the emulated USB mass storage device in consecutive read-out steps and are transmitted to the data processing unit, in particular the CNC machine tool. Due to the implementation according to the invention, the CNC machine tool and/or the data processing unit allocated to the CNC machine tool can be connected to the storage medium for communication purposes in an advantageously simple and/or advantageously reliable manner. It is in particular advantageously possible to do without a complex and/or fault-prone configuration of the CNC machine tool and/or of the data processing unit for a communication with the storage medium.

It is further proposed that the method comprises at least one method step in which at least the tool presetting data set of the machining tool, the tool measuring data set of the machining tool and/or the tool processing data set of the machining tool are/is determined and/or created by a tool presetting and/or tool measuring apparatus, and comprises an input step, in which the determined tool presetting data set of the machining tool, the determined tool measuring data set of the machining tool and/or the determined tool processing data set of the machining tool are/is, in particular in a wireless manner, transferred to the storage medium and is stored in the storage medium. Preferentially the machining tool is fixated on the tool holder in a preparation step. Preferably, in particular during the preparation step, the tool identification characteristic of the machining tool and/or of the tool holder is captured via a further tool identification unit, which is in particular allocated to the tool presetting and/or tool measuring apparatus and/or to the tool transport device. Preferably, during the preparation step the tool identification characteristic is transmitted to the storage medium and/or to the tool presetting and/or tool measuring apparatus. Preferably, in at least one method step the machining tool, in particular together with the tool holder, is measured and/or preset by means of the tool presetting and/or tool measuring apparatus. Preferentially, during a measuring and/or presetting of the machining tool by the tool presetting and/or tool measuring apparatus, the tool presetting data set, the tool measuring data set and/or the tool processing data set are/is determined and/or created. Preferably the tool identification characteristic captured, in particular captured in the preparation step, is allocated to the tool presetting data set, the tool measuring data set and/or the tool processing data set as a data identification characteristic. It is conceivable that a capturing of the tool identification characteristic is carried out before, after and/or during a measuring and/or presetting of the machining tool by the tool presetting and/or tool measuring apparatus. Preferentially, in the input step the tool presetting data set, the tool measuring data set and/or the tool processing data set are/is transferred to the storage medium, in particular together with the tool identification characteristic, in particular as a data identification characteristic. A transfer from the tool presetting and/or tool measuring apparatus to the storage medium is preferably effected via a wireless data communication interface, in particular a Bluetooth interface and/or a WLAN interface, of the data communication unit. Preferentially, after the input step the machining tool and/or the storage medium are/is prepared, e.g. packaged, for transport to the CNC machine tool, is arranged on the transport means, is sorted into a collection of further machining tools, or the like. The implementation according to the invention enables achieving of advantageously reliable handling of captured and/or determined tool data sets concerning the measured and/or preset machining tool. It is in particular possible to dispense with creating paper-bound and/or printed tool data sets. In particular, a risk of mixing up tool data sets can be kept at an advantageously low level.

It is also proposed that tool processing data sets, tool measuring data sets and/or tool processing data sets of a plurality of machining tools are stored by the storage medium. Preferentially at least one tool presetting data set, one tool measuring data set and/or one tool processing data set of at least two, preferably of all, machining tools, are/is stored in the storage medium, said tool data sets, in particular coming from the tool presetting and/or tool measuring apparatus, are delivered together to the CNC machine tool during the tool delivery step. Preferably at least one tool presetting data set, one tool measuring data set and/or one tool processing data set of at least two, preferably of all, machining tools which are arranged on the tool transport device during the tool delivery step are/is stored in the storage medium. The implementation according to the invention enables an advantageously simple administration of a plurality of machining tools. It is in particular possible to do without a plurality of storage media. In particular, a risk of mixing up machining tool and storage medium with the allocated tool data sets can be kept at an advantageously low level.

Beyond this it is proposed that the storage medium comprises a database, wherein in the input step a suitable machining tool in the database is unambiguously allocated to the determined tool presetting data set of the machining tool, the determined tool measuring data set of the machining tool and/or the determined tool processing data set of the machining tool. The database preferably comprises a further tool presetting data set, a further tool measuring data set and/or a further tool processing data set. For example, the further tool presetting data set, the further tool measuring data set and/or the further tool processing data set comprise/comprises values measured and/or preset in a previous run of the method, in particular a history of values and/or an average value of values, and/or manufacturer's information. Preferentially, in the input step a currently measured and/or preset machining tool is matched with the database, and is in particular unambiguously allocated to an entry in the database. Preferably, during the input step values missing in the current tool presetting data set, the current tool measuring data set and/or the current tool processing data set are supplemented by the corresponding values of the further tool presetting data set, the further tool measuring data set and/or the further tool processing data set. It is conceivable that the database is, in particular automatically, actualized during the input step by way of the current tool presetting data set, the current tool measuring data set and/or the current tool processing data set. Due to the implementation according to the invention, the storage medium is capable of storing an advantageously large information content concerning the machining tool. It is in particular possible that an advantageously large quantity of information is transmitted to the CNC machine tool, in particular to the data processing unit, via the machining tool.

It is further proposed that the method comprises at least one allocation step, in which a CNC machine tool, in particular a task within the CNC machine tool and/or a tool magazine place within the CNC machine tool, is allocated to the machining tool. Preferably an allocation of a CNC machine tool, in particular of a task within the CNC machine tool and/or of a tool magazine place within the CNC machine tool, is carried out via the tool presetting and/or tool measuring apparatus. It is however also conceivable that the data communication unit comprises a user interface for carrying out the allocation step, which is realized separately from the tool presetting and/or tool measuring apparatus. The allocation step is preferably carried out before the tool delivery step. Preferentially the allocation of the CNC machine tool, in particular of the task within the CNC machine tool and/or the tool magazine place within the CNC machine tool, are/is stored in the storage medium together with the tool presetting data set, the tool measuring data set and/or the further tool processing data set. The implementation according to the invention allows a realization of an advantageously back-traceable progression of the method. In particular, a designated location of the machining tool is known in each method step. In particular, it is possible to advantageously quickly identify the responsible machining tool, for example in case of faulty production.

It is also proposed that in the read-out step the allocation to the CNC machine tool, in particular to the task within the CNC machine tool and/or the tool magazine place within the CNC machine tool, is read out of the storage medium and is transmitted to the data processing unit allocated to the CNC machine tool, in particular to the CNC machine tool. Preferentially the allocation to the CNC machine tool is read out prior to the tool presetting data set, the tool measuring data set and/or the tool processing data set. Preferably, in a start phase of the read-out step all data identification characteristics are read out which are stored together, each with respectively one allocation to the CNC machine tool. In particular, data identification characteristics which are linked with an allocation to a further CNC machine tool are skipped. Preferentially the read-out data identification characteristics are transferred to the tool identification unit. It is in particular conceivable that the data identification characteristics which are stored together, each with respectively one allocation to the CNC machine tool, are read out automatically before a first tool identification step, for example initiated by a proximity sensor and/or by way of entering into the reach of the wireless data communication interface. Preferably, in the read-out step, following a successful identification of the machining tool, which is in particular allocated to the CNC machine tool, the task within the CNC machine tool and/or the tool magazine place within the CNC machine tool are/is transmitted to the data processing unit together with the tool presetting data set, the tool measuring data set and/or the tool processing data set. Due to the implementation according to the invention, it is possible that a loading of the CNC machine tool with the machining tool, following the read-out step, can be realized in an advantageously fast fashion. In particular, an evaluation of the tool data sets, the allocated task and/or the allocated tool magazine place by the data processing unit may start directly after the transmission. In particular, it is possible for a loading of the CNC machine tool with the machining tool to start directly after the identification step. In particular, a manual input during the read-out step for an allocation of a task and/or of a tool magazine place is advantageously omitted.

Beyond this it is proposed that the method comprises a matching step, in which at least a plausibility of an allocation made in the allocation step and/or at least a compatibility of a machining tool delivered to the CNC machine tool in the delivery step are/is matched with the respective CNC machine tool. Preferably the data processing unit checks the plausibility of the allocation made, in particular the compatibility, of the delivered machining tool with the CNC machine tool, in particular with the task within the CNC machine tool and/or the tool magazine place within the CNC machine tool. Preferentially the data processing unit checks the plausibility of the allocation made, in particular the compatibility, by a matching of the tool presetting data set, the tool measuring data set and/or the tool processing data set with current status information of the CNC machine tool, with manufacturer information of the CNC machine tool stored in the data processing unit and/or with project data programmed in the data processing unit, in particular workpiece data. The implementation according to the invention allows advantageously early detection of an erroneous allocation. It is in particular possible to keep wear-down of the machining tool and/or of the CNC machine tool, in particular caused by an erroneous allocation, at an advantageously low level.

The invention furthermore relates to a communication device for a transmission of at least one tool presetting data set of a machining tool determined by means of a tool presetting and/or tool measuring apparatus, a tool measuring data set of the machining tool and/or a tool processing data set of the machining tool to a machine tool controlled by Computerized Numerical Control (CNC machine tool), in particular for an execution of the method according to the invention, with a tool identification unit, which is in particular allocated to the CNC machine tool, with an, in particular electronic, storage medium that is configured for a storage of at least the tool presetting data set of the machining tool, at least the tool measuring data set of the machining tool and/or at least the tool processing data set of the machining tool, and with a data communication unit. It is proposed that the data communication unit is configured, initiated by an identification of a machining tool via the tool identification unit, to read out of the storage medium and transfer to the CNC machine tool at least the tool presetting data set belonging to the machining tool, at least the tool measuring data set belonging to the machining tool and/or the processing data set belonging to the machining tool. The communication device is preferably configured for an administration of tool data sets, in particular the tool presetting data set, the tool processing data set and/or the tool measuring data set. In particular, the communication device is configured for outputting at least one tool data set, in particular the tool presetting data set, the tool processing data set and/or the tool measuring data set, of the machining tool that has been unambiguously identified via the tool identification unit. In particular, an output of a tool data set, in particular the tool presetting data set, the tool processing data set and/or the tool measuring data set, and/or a communication between the storage medium, the tool identification unit and/or an external device is realized via the data communication unit. The data communication unit preferably comprises at least one wireless data communication interface, in particular a Bluetooth interface and/or a WLAN interface. The implementation of the communication device according to the invention enables achieving an advantageously reliable supply of the CNC machine tool with tool data sets concerning the machining tool used. It is in particular possible to dispense with generating paper-bound and/or printed tool data sets. In particular, in a transmission a risk of mixing up tool data sets and/or of an input error can be kept at an advantageously low level.

It is also proposed that the communication device comprises a tool transport device, in particular a tool cart, for a delivery of the machining tool to the CNC machine tool, with the storage medium arranged on the tool transport device. Preferentially the storage medium is integrated in the tool transport device. It is however also conceivable that the storage medium is arranged on the tool transport device in a releasable manner. The tool transport device is preferably embodied as a tool cart. Preferably at least one data communication interface, in particular a Bluetooth interface and/or a WLAN interface, of the data communication unit is integrated in the tool transport device, in particular for a transmission of tool data sets from the storage medium to the data processing unit. The implementation according to the invention allows providing an advantageously compact communication device. In particular, the storage medium can be transported, in particular from a preparation area, maintenance area and/or storage area, to the CNC machine tool advantageously together with the machining tool, in particular at the same time as the machining tool and in particular without additional effort. In particular, long communication distances between the storage medium and the CNC machine tool and/or the data processing unit can be avoided.

Beyond this it is proposed that the tool transport device comprises a further tool identification unit and a display element, the display element being configured, initiated by a tool identification via the further tool identification unit, to display tool information of the machining tool read out of the storage medium of the tool transport device, tool presetting data sets belonging to the machining tool, tool measuring data sets belonging to the machining tool and/or tool processing data sets belonging to the machining tool. Preferentially the further tool identification unit comprises a manual scanner, in particular analogously to the tool identification unit. Alternatively the further tool identification unit is integrated in the tool transport device. In particular, the further tool identification unit is configured for a capturing of the tool identification characteristic. The display element is preferably embodied as a monitor screen, in particular a touchscreen, and/or as a video projector. The display element is preferentially configured to display at least one tool data set that is allocated to the tool identification characteristic, in particular the tool presetting data set, the tool measuring data set and/or the tool processing data set, and/or to indicate the allocated CNC machine tool, in particular the task within the CNC machine tool and/or the tool magazine place within the CNC machine tool. The tool transport device preferably comprises at least one input element, in particular the touchscreen, for a processing of the tool data set, in particular the tool presetting data set, the tool measuring data set and/or the tool processing data set, of the captured tool identification characteristic and/or of the allocation of the CNC machine tool, in particular the task within the CNC machine tool and/or the tool magazine place within the CNC machine tool. The implementation according to the invention advantageously allows retrieving the data stored in the storage medium at any time. In particular, advantageously a check of the delivered machining tool can be carried out, in particular by a user.

Furthermore a system is proposed, with the communication device comprising the storage medium according to the invention, with a tool presetting and/or tool measuring apparatus, with a CNC machine tool and/or with at least one machining tool. Preferably the system comprises the data processing unit that is allocated to the CNC machine tool. Preferentially the data processing unit is integrated in the CNC machine tool. The implementation according to the invention enables providing a system with an advantageously reliable loading of the CNC machine tool with machining tools. It is in particular possible to provide a system requiring an advantageously little amount of manual administration of the tool data sets. In particular, a throughput time for a loading of the CNC machine tool can be kept at an advantageously low level.

The method according to the invention, the communication device according to the invention and/or the system according to the invention are/is herein not to be restricted to the application and implementation described above. In particular, for fulfilling a functionality that is described here, the method according to the invention, the communication device according to the invention and/or the system according to the invention may comprise a number of individual elements, structural components and units that differs from a number mentioned here.

DRAWINGS

Further advantages will become apparent from the following description of the drawings. The drawings show an exemplary embodiment of the invention. The drawings, the description and the claims contain a plurality of features in combination. Someone skilled in the art will purposefully also consider the features individually and will find further expedient combinations.

Figure 2:
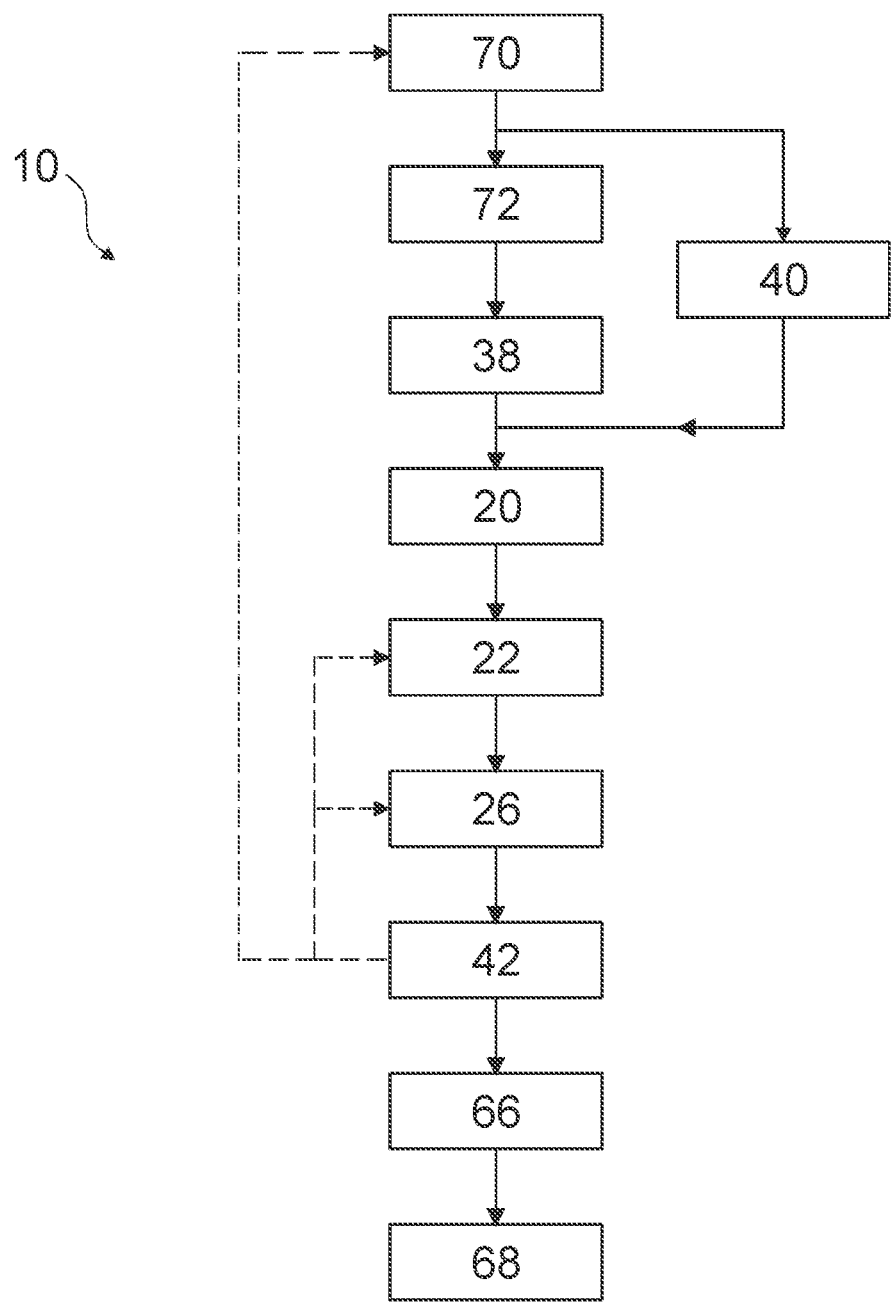
Figure 3:
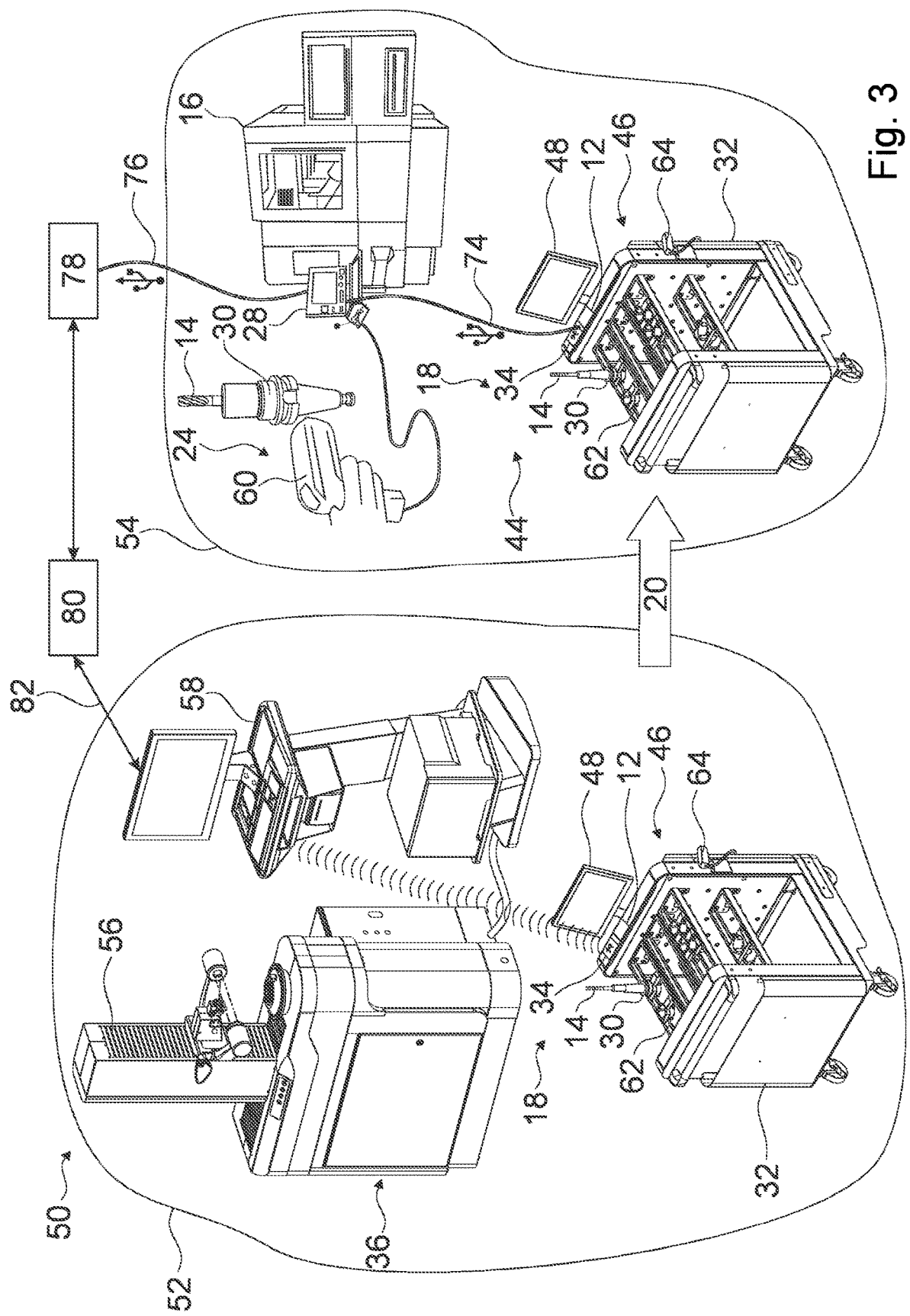

It is shown in:

FIG. 1 a system according to the invention with a communication device according to the invention, FIG. 2 a flow chart of a method according to the invention, and FIG. 3 the system according to the invention with a further configuration of the communication device according to the invention.

DESCRIPTION OF THE EXEMPLARY EMBODIMENT

FIG. 1 shows a system 50. The system 50 comprises a communication device 44. The communication device 44 comprises a storage medium 12. The system 50 comprises a tool presetting and/or tool measuring apparatus 36. The system 50 comprises a machine tool that is controlled via Computerized Numerical Control (CNC machine tool) 16. The system 50 comprises a machining tool 14.

The tool presetting and/or tool measuring apparatus 36 is configured for measuring and/or presetting the machining tool 14. The tool presetting and/or tool measuring apparatus 36 is configured to create and/or determine at least one tool data set, in particular a tool presetting data set, a tool measuring data set and/or a tool processing data set, of the machining tool 14. The tool presetting and/or tool measuring apparatus 36 comprises at least one presetting and/or measuring station 56 for a presetting and measuring of the machining tool 14. The tool presetting and/or tool measuring apparatus 36 comprises at least one user interface 58 for operating the presetting and/or measuring station 56 and/or for an administration of the determined tool data sets, in particular the tool presetting data sets, the tool measuring data sets and/or the tool processing data sets, in particular of a plurality of machining tools.

The machining tool 14 is configured to be inserted into the CNC machine tool 16, in particular for the purpose of processing a workpiece. The system 50, in particular the CNC machine tool 16, comprises a tool holder 30 for holding the machining tool 14. The tool holder 30 is connected with the CNC machine tool 16 in a non-destructively releasable manner.

The system 50 comprises a data processing unit 28 which is allocated to the CNC machine tool 16, in particular integrated in the CNC machine tool 16 and/or arranged on the CNC machine tool 16. The data processing unit 28 is configured to process at least one tool data set, in particular the tool presetting data set, the tool measuring data set and/or the tool processing data set, of the machining tool 14, in particular for a controlling or regulation of the CNC machine tool 16.

The CNC machine tool 16 and the tool presetting and/or tool measuring apparatus 36 are arranged spaced apart from each other, for example for a spatial separation of a preparation area 52 from a work area 54. The communication device 44 is configured to store in the storage medium 12 and provide to the CNC machine tool 16, in particular within the work area 54, at least one tool data set of the machining tool 14 and/or of at least one further machining tool, which has been created by the tool presetting and/or tool measuring apparatus 36, in particular in the preparation area 52. The communication device 44 is configured for a transmission at least of the tool presetting data set of the machining tool 14, the tool measuring data set of the machining tool 14 and/or the tool processing data set of the machining tool 14, which have/has been determined by means of the tool presetting and/or tool measuring apparatus 36, to the CNC machine tool 16.

The communication device 44 comprises a tool identification unit 24, which is in particular allocated to the CNC machine tool 16. The tool identification unit 24 comprises a manual scanner 60, in particular for a capturing of a tool identification characteristic of the machining tool 14 and/or of the tool holder 30. The tool identification unit 24 is allocated to the CNC machine tool 16 and is in particular, for data exchange purposes, connected to the data processing unit 28 that is allocated to the CNC machine tool 16. It is also conceivable that, in particular for a wireless transfer of a captured tool identification characteristic to the data processing unit 28 and/or to the storage medium 12, a wireless data interface of a data communication unit 18 of the communication device 44 is arranged on the tool identification unit 24, in particular on the manual scanner 60. The communication device 44 comprises the, in particular electronic, storage medium 12, which is configured to store at least the tool presetting data set of the machining tool 14, at least the tool measuring data set of the machining tool 14 and/or at least the tool processing data set of the machining tool 14. The communication device 44 comprises the data communication unit 18. The data communication unit 18 comprises at least one wireless data communication interface 34, in particular a Bluetooth interface and/or a WLAN interface. The data communication unit 18 is configured, initiated by an identification of the machining tool 14 via the tool identification unit 24, to read out of the storage medium 12 at least the tool presetting data set belonging to the machining tool 14, at least the tool measuring data set belonging to the machining tool 14 and/or at least the tool processing data set belonging to the machining tool 14. The data communication unit 18 is configured, initiated by an identification of the machining tool 14 via the tool identification unit 24, to transfer at least the tool presetting data set belonging to the machining tool 14, at least the tool measuring data set belonging to the machining tool 14 and/or at least the tool processing data set belonging to the machining tool 14 to the CNC machine tool 16, in particular to the data processing unit 28 that is allocated to the CNC machine tool 16, in particular via the wireless data communication interface 34.

The communication device 44 comprises a tool transport device 32, in particular a tool cart, for a delivery of the machining tool 14 to the CNC machine tool 16, with the storage medium 12 being arranged on the tool transport device 32. The tool transport device 32 is embodied as a tool cart. The tool transport device 32 is configured to transport the machining tool 14 and/or further machining tools between the preparation area 52 and the work area 54. The tool transport device 32 comprises at least one tool storage element 62, for example a depository, a suspension, a clip, a stand, or the like, for a storage, in particular a temporary fixation, of the machining tool 14 and/or further machining tools on the tool transport device 32. The storage medium 12 is fixedly integrated in the tool transport device 32 and/or connected with the tool transport device 32 in a non-destructively releasable manner. At least one wireless data communication interface 34 of the data communication unit 18 is arranged on the tool transport device 32. The wireless data communication interface 34 is signal-technologically connected with the storage medium 12. The tool transport device 32 comprises a further tool identification unit 46. The tool transport device 32 comprises a display element 48. The display element 48 is configured, initiated by a tool identification via the further tool identification unit 46, to display tool information of the machining tool 14, tool presetting data sets belonging to the machining tool 14, tool measuring data sets belonging to the machining tool 14 and/or tool processing data sets belonging to the machining tool 14, which have/has been read out of the storage medium 12 of the tool transport device 32. The further tool identification unit 46 comprises at least one further manual scanner 64. The display element 48 is realized as a monitor screen. In an alternative implementation the storage medium 12 is stationary, and is arranged in particular between the preparation area 52 and the work area 54, in particular in a communication range of the tool presetting and/or tool measuring apparatus 36 and the data processing unit 28.

FIG. 2 shows a flow chart of a method 10. The method 10 is configured for a transmission at least of the tool presetting data set of the machining tool 14 stored on the, in particular electronic, storage medium 12, the tool measuring data set of the machining tool 14 stored on the, in particular electronic, storage medium 12 and/or the tool processing data set of the machining tool 14 stored on the, in particular electronic, storage medium 12 to the CNC machine tool 16 with the data communication unit 18.

In a tool delivery step 20 of the method 10 at least the machining tool 14 is delivered to the CNC machine tool 16. In the tool delivery step 20 the machining tool 14 is transported from the preparation area 52 into the work area 54. The machining tool 14 and/or at least one further machining tool are/is delivered in the tool delivery step 20 by means of the tool transport device 32. It is however also conceivable that the machining tool 14 and/or at least one further machining tool are/is transported to the CNC machine tool 16 by hand in the tool delivery step 20.

In a tool identification step 22 of the method 10 the delivered machining tool 14 is identified via the tool identification unit 24, which is in particular allocated to the CNC machine tool 16. In the tool identification step 22 the tool identification characteristic of the machining tool 14 and/or of the tool holder 30 is read in by means of the tool identification unit 24. In the tool identification step 22 the captured tool identification characteristic is transmitted to the data processing unit 28 and/or to the storage medium 12.

In a read-out step 26 of the method 10 at least the tool presetting data set of the machining tool 14, at least the tool measuring data set of the machining tool 14 and/or at least the tool processing data set of the machining tool 14 are/is read out of the storage medium 12 by the data communication unit 18. The read-out step 26 is situated temporally after the tool identification step 22. In the read-out step 26 the tool presetting data set of the machining tool 14, at least the tool measuring data set of the machining tool 14 and/or at least the tool processing data set of the machining tool 14 are/is transmitted at least to the data processing unit 28 that is allocated to the CNC machine tool 16, in particular to the CNC machine tool 16, by the data communication unit 18. In a transmission of the tool presetting data set of the machining tool 14, the tool measuring data set of the machining tool 14 and/or the tool processing data set of the machining tool 14 via the data communication unit 18, the storage medium 12 is arranged apart from the machining tool 14, apart from a tool holder 30 holding the machining tool 14 and apart from the CNC machine tool 16. In the read-out step 26 the tool identification characteristic captured via the tool identification unit 24 is matched with a data identification characteristic in the storage medium 12, which is in particular linked to the tool presetting data set, the tool measuring data set and/or the tool processing data set. In the read-out step 26 at least one tool data set belonging to the tool identification characteristic, in particular the tool presetting data set, the tool measuring data set and/or the tool processing data set, is read out from the storage medium 12 by means of the data communication unit 18. In the read-out step 26 the read-out tool data set is transmitted to the data processing unit 28 via the data communication unit 18.

The read-out step 26 is automatically initiated by the tool identification step 22. The read-out step 26 is initiated by a capture of the tool identification characteristic during the tool identification step 22 and/or by a transmission of the captured tool identification characteristic to the data processing unit 28 and/or to the storage medium 12. It is conceivable that prior to an initiation of the read-out step 26, a format matching of the captured tool identification characteristic with an expected data format for a tool identification characteristic is carried out, in particular in regard to a completeness of the tool identification characteristic. In case of a negative result of the format matching, a request is output, in particular to a user, for a re-read-in, for a manual correction and/or for a selection from known tool identification characteristics having at least a partial congruency with the captured tool identification characteristic. In case of a positive result of the format matching, the read-out step 26 is initiated automatically.

The storage medium 12 is arranged, at least during the tool delivery step 20, on the tool transport device 32, in particular the tool cart, for a delivery of the machining tool 14 to the CNC machine tool 16. During the tool delivery step 20 the storage medium 12 is transported, in particular by means of the tool transport device 32, from the preparation area 52, in particular the tool presetting and/or tool measuring apparatus 36, to the work area 54, in particular the data processing unit 28. The storage medium 12 is fixedly integrated in the tool transport device 32 and/or is arranged therein, for example in a memory-card reading device of the tool transport device 32, at least during the tool delivery step 20, in a non-destructively releasable manner.

In the read-out step 26 the tool presetting data set of the machining tool 14, the tool measuring data set of the machining tool 14 and/or the tool processing data set of the machining tool 14 are/is transferred via the wireless data communication interface 34 of the data communication unit 18. In the read-out step 26, for a transfer of the tool presetting data set of the machining tool 14, the tool measuring data set of the machining tool 14 and/or the tool processing data set of the machining tool 14, a Bluetooth interface of the wireless data communication interface 34 and/or a WLAN interface of the wireless data communication interface 34 are/is activated. In the read-out step 26 the tool presetting data set of the machining tool 14, the tool measuring data set of the machining tool 14 and/or the tool processing data set of the machining tool 14 are/is transferred from the storage medium 12, which is in particular arranged on the tool transport device 32, to the data processing unit 28 via the Bluetooth interface and/or the WLAN interface. In the read-out step 26 an allocation to the CNC machine tool 16, in particular to a task within the CNC machine tool 16 and/or to a tool magazine place within the CNC machine tool 16, is read out of the storage medium 12 and is transmitted to the data processing unit 28 that is allocated to the CNC machine tool 16, in particular to the CNC machine tool 16. In the read-out step 26 the allocation to the CNC machine tool 16, in particular to the task within the CNC machine tool 16 and/or to the tool magazine place within the CNC machine tool 16, is transmitted from the storage medium 12, which is in particular arranged on the tool transport device 32, to the data processing unit 28 via the Bluetooth interface and/or the WLAN interface. In an alternative implementation the task within the CNC machine tool 16 and/or the tool magazine place within the CNC machine tool 16 are/is allocated, in particular entered, manually at the data processing unit 28 that is allocated to the CNC machine tool 16 during the read-out step 26.

In a matching step 42 of the method 10 at least a plausibility of an allocation made in an allocation step 40 of the method 10 and/or at least a compatibility of a machining tool 14 delivered to the CNC machine tool 16 in the tool delivery step 20 is matched with the respective CNC machine tool 16. In case of a positive result of the matching, in a loading and processing step 66 of the method 10, the CNC machine tool 16 is loaded with the machining tool 14, in particular together with the tool holder 30, and then a workpiece is processed with the CNC machine tool 16 and the machining tool 14. In a reverse-operation step 68, in particular after completion of a processing of a workpiece with the machining tool 14, the tool processing data set of the machining tool 14, in particular a remaining service life, is actualized by the data processing unit 28. The actualized tool processing data set of the machining tool 14 is transmitted to the storage medium 12 and is stored in the storage medium 12, in particular in a database of the storage medium 12. In the reverse-operation step 68 the machining tool 14 is taken out of the CNC machine tool 16, in particular together with the tool holder 30. In the reverse-operation step 68 the machining tool 14 is transported, in particular together with the storage medium 12, in particular by means of the tool transport device 32, into the preparation area 52, into a storage area and/or into a maintenance area.

In a preparation step 70 of the method 10 the machining tool 14 is fixated on the tool holder 30. The tool identification characteristic is read in from the machining tool 14 and/or from the tool holder 30, in particular during the preparation step 70, via the further tool identification unit 46 and/or via an additional tool identification unit 70, which is in particular allocated to the tool presetting and/or tool measuring apparatus 36.

In at least one measuring and/or presetting step 72 of the method 10 at least the tool presetting data set of the machining tool 14, at least the tool measuring data set of the machining tool 14 and/or at least the tool processing data set of the machining tool 14 are/is determined and/or created via the tool presetting and/or tool measuring apparatus 36. For measuring and/or presetting, the machining tool 14, in particular together with the tool holder 30, is arranged on the tool presetting and/or tool measuring apparatus 36, in particular the presetting and/or measuring station 56.

In an input step 38 of the method 10 the determined tool presetting data set of the machining tool 14, the determined tool measuring data set of the machining tool 14 and/or the determined tool processing data set of the machining tool 14 are/is transferred, in particular in a wireless fashion, to the storage medium 12 and is stored in the storage medium 12. In the input step 38 and/or in the measuring and/or presetting step 72 the determined tool presetting data set, the determined tool measuring data set and/or the determined tool processing data set are/is linked with the captured tool identification characteristic as a data identification characteristic. In the input step 38 the determined tool presetting data set, the determined tool measuring data set and/or the determined tool processing data set are/is transferred, via the wireless data communication interface 34, from the tool presetting and/or tool measuring apparatus 36 to the storage medium 12, which is in particular arranged on the tool transport device 32. Tool presetting data sets, tool measuring data sets and/or tool processing data sets of a plurality of machining tools are stored by the storage medium 12. In particular, the tool presetting data sets, tool measuring data sets and/or tool processing data sets belonging to different machining tools are stored by the storage medium 12 with respectively one allocated tool identification characteristic as a data identification characteristic. Via the data identification characteristic and/or the tool identification characteristic, one certain machining tool is unambiguously allocatable to each tool data set stored in the storage medium 12 and/or at least one tool data set is unambiguously allocatable to each machining tool. The storage medium 12 comprises a database. The database comprises at least one tool data set, in particular a tool presetting data set, a tool measuring data set and/or a tool processing data set, of a plurality of machining tools. In the input step 38 a suitable machining tool in the database is unambiguously allocated to the determined tool presetting data set of the machining tool 14, the determined tool measuring data set of the machining tool 14 and/or the determined tool processing data set of the machining tool 14. The determined tool presetting data set, the determined tool measuring data set and/or the determined tool processing data set are/is supplemented by missing information from the database, for example a remaining service life. In the at least one allocation step 40 a CNC machine tool 16, in particular a task within the CNC machine tool 16 and/or a tool magazine place within the CNC machine tool 16, is allocated to the machining tool 14. The allocation during the allocation step 40 is effected via the user interface 58 of the tool presetting and/or tool measuring apparatus 36 and/or via an input element at the tool transport device 32.

FIG. 3 shows a further configuration of the communication device 44. During the read-out step 26 the storage medium 12 is connected with the data processing unit 28 and/or the CNC machine tool 16 via a USB connection 74. At least in the read-out step 26 for a transfer of the tool presetting data set of the machining tool 14, the tool measuring data set of the machining tool 14 and/or the tool processing data set of the machining tool 14, the storage medium 12 and/or the data communication unit 18 emulate/s a USB mass storage device. The system 50 comprises a further storage medium 78. Analogously to the storage medium 12, the further storage medium 78 is configured to store the tool presetting data set of the machining tool 14, the tool measuring data set of the machining tool 14 and/or the tool processing data set of the machining tool 14. The further storage medium 78 is connected to a network 80, in particular in a wire-bound fashion and/or wireless fashion. The further storage medium 78 emulates a USB mass storage device, at least during the read-out step 26. The further storage medium 78 is connected to the data processing unit 28, in particular to the CNC machine tool 16, via a further USB connection 76.

In particular, in the input step 38 the determined tool presetting data set of the machining tool 14, the determined tool measuring data set of the machining tool 14 and/or the determined tool processing data set of the machining tool 14 are/is transferred to the further storage medium 78 via the network 80, in particular via a wireless and/or wire-bound network connection 82. In particular, in the input step 38 the determined tool presetting data set of the machining tool 14, the determined tool measuring data set of the machining tool 14 and/or the determined tool processing data set of the machining tool 14 are/is stored in the further storage medium 78. The determined tool presetting data set, the determined tool measuring data set and/or the determined tool processing data set are/is supplemented in the further storage medium 78, analogously to the storage medium 12, by missing information, for example concerning a remaining service life, from a database of the further storage medium 78. In particular, the determined tool presetting data set, the determined tool measuring data set and/or the determined tool processing data set are matched and/or supplemented by missing information from an external database that is connected via the network 80. It is conceivable that the storage medium 12 is connected to the network 80 via the wireless data communication interface 34. It is in particular also conceivable that the storage medium 12 and the further storage medium 78 constitute the same storage medium.

REFERENCE NUMERALS 10 method
12 storage medium
14 machining tool
16 CNC machine tool
18 data communication unit
20 tool delivery step
22 tool identification step
24 tool identification unit
26 read-out step
28 data processing unit
30 tool holder
32 tool transport device
34 data communication interface
36 tool presetting and/or tool measuring apparatus
38 input step
40 allocation step
42 matching step
44 communication device
46 further tool identification step
48 display element
50 system
52 preparation area
54 work area
56 presetting and/or measuring station
58 user interface
60 manual scanner
62 tool storage element
64 further manual scanner
66 loading and processing step
68 reverse-operation step
70 preparation step
72 measuring and/or presetting step
74 USB connection
76 further USB connection
78 further storage medium
80 network
82 network connection

The invention claimed is:

1. A method for transmitting at least one tool presetting data set of a machining tool that is stored on an electronic storage medium, at least one tool measuring data set of the machining tool that is stored on the electronic storage medium and/or at least one tool processing data set of the machining tool that is stored on the electronic storage medium to a machine tool that is controlled via Computerized Numerical Control [CNC machine tool], with a data communication unit,
   wherein during a preparation step, an unambiguous tool identification characteristic of the machining tool is captured,
   wherein in a measuring and/or presetting step at least the tool presetting data set of the machining tool, at least the tool measuring data set of the machining tool and/or at least the tool processing data set of the machining tool are/is determined and/or created via a tool presetting and/or tool measuring apparatus,
   wherein in an input step, in which the determined tool presetting data set of the machining tool, the determined tool measuring data set of the machining tool and/or the determined tool processing data set of the machining tool are/is transferred to the electronic storage medium and stored in the electronic storage medium,
   wherein the tool identification characteristic captured in the preparation step, is allocated to the tool presetting data set, the tool measuring data set and/or the tool processing data set as a data identification characteristic,
   wherein in a tool delivery step at least the machining tool is delivered to the CNC machine tool and wherein in a tool identification step the delivered machining tool is identified via a tool identification unit by way of capturing via the tool identification unit the unambiguous tool identification characteristic that is allocated to the machining tool, comprising a read-out step, which is automatically initiated by the tool identification step and in which at least the tool presetting data set of the machining tool, the tool measuring data set of the machining tool and/or the tool processing data set of the machining tool are/is read out of the storage medium by the data communication unit and is transmitted to a data processing unit that is allocated to the CNC machine tool,
   wherein the read-out step is automatically stopped if a matching of the tool identification characteristic with the data identification characteristic has a negative result, and
   wherein the storage medium is arranged on a tool cart for a delivery of the machining tool to the CNC machine tool and apart from the machining tool, apart from a tool holder holding the machining tool and apart from the CNC machine tool.

2. The method according to claim 1, wherein in the read-out step the tool presetting data set of the machining tool, the tool measuring data set of the machining tool and/or the tool processing data set of the machining tool are/is transferred via a wireless data communication interface of the data communication unit.

3. The method according to claim 2, wherein in the read-out step, for a transfer of the tool presetting data set of the machining tool, the tool measuring data set of the machining tool and/or the tool processing data set of the machining tool, a Bluetooth interface of the wireless data communication interface and/or a wireless local area network (WLAN) interface of the wireless data communication interface are/is activated.

4. The method according to claim 1, wherein at least in the read-out step, for the transfer of the tool presetting data set of the machining tool, the tool measuring data set of the machining tool and/or the tool processing data set of the machining tool, the storage medium and/or the data communication unit emulate/s a universal serial bus (USB) mass storage device.

5. The method according to claim 1, wherein tool presetting data sets, tool measuring data sets and/or tool processing data sets of a plurality of machining tools are stored by the storage medium.

6. The method according to claim 1, wherein the storage medium comprises a database, wherein in the input step a suitable machining tool in the database is unambiguously allocated to the determined tool presetting data set of the machining tool, the determined tool measuring data set of the machining tool and/or the determined tool processing data set of the machining tool.

7. The method according to claim 1, comprising at least one allocation step, in which the CNC machine tool is allocated to the machining tool.

8. The method according to claim 7, wherein in the read-out step the allocation to the CNC machine tool is read out of the storage medium and is transmitted to the data processing unit allocated to the CNC machine tool.

9. The method according to claim 7, comprising a matching step, in which at least a plausibility of an allocation made in the allocation step and/or at least a compatibility of a machining tool delivered to the CNC machine tool in the delivery step are/is matched with the respective CNC machine tool.

10. A communication device for a transmission of at least one tool presetting data set of a machining tool determined by means of a tool presetting and/or tool measuring apparatus, a tool measuring data set of the machining tool and/or a tool processing data set of the machining tool to a machine tool controlled by Computerized Numerical Control [CNC machine tool] for an execution of a method according to claim 1, with a tool identification unit with an electronic storage medium that is configured for a storage of at least the tool presetting data set of the machining tool, at least the tool measuring data set of the machining tool and/or at least the tool processing data set of the machining tool, with a tool cart for a delivery of the machining tool to the CNC machine tool, with the storage medium arranged on the tool transport device and with a data communication unit, which is configured, initiated by an identification of the machining tool via the tool identification unit, to read out of the storage medium and transfer to the CNC machine tool at least the tool presetting data set belonging to the machining tool, at least the tool measuring data set belonging to the machining tool and/or at least the processing data set belonging to the machining tool.

11. The communication device according to claim 10, wherein the tool transport device comprises a further tool identification unit and a display element, wherein the display element is configured, initiated by a tool identification via the further tool identification unit, to display tool information of the machining tool read out of the storage medium of the tool transport device, tool presetting data sets belonging to the machining tool, tool measuring data sets belonging to the machining tool and/or tool processing data sets belonging to the machining tool.

12. A system with the communication device according to claim 10, comprising an electronic storage medium, with a tool presetting and/or tool measuring apparatus, with a CNC machine tool and/or with at least one machining tool.

* * * * *